US011933254B1

(12) United States Patent
Zeyger

(10) Patent No.: US 11,933,254 B1
(45) Date of Patent: Mar. 19, 2024

(54) SYSTEM AND METHOD OF CLEANING AIR ENTERING AN ENGINE OF A VEHICLE

(71) Applicant: Eugene Zeyger, Medfield, MA (US)

(72) Inventor: Eugene Zeyger, Medfield, MA (US)

(*) Notice: Subject to any disclaimer, the term of this patent is extended or adjusted under 35 U.S.C. 154(b) by 0 days.

(21) Appl. No.: 18/226,900

(22) Filed: Jul. 27, 2023

Related U.S. Application Data

(60) Provisional application No. 63/576,961, filed on Mar. 20, 2023, provisional application No. 63/576,266, filed on Jan. 30, 2023.

(51) Int. Cl.
*F02M 35/08* (2006.01)
*F02M 35/02* (2006.01)
*F02M 35/022* (2006.01)

(52) U.S. Cl.
CPC .... *F02M 35/0209* (2013.01); *F02M 35/0223* (2013.01); *F02M 35/084* (2013.01)

(58) Field of Classification Search
CPC ........... F02M 35/0209; F02M 35/0223; F02M 35/084
USPC ............................ 55/456, 443; 524/409, 570
See application file for complete search history.

(56) References Cited

U.S. PATENT DOCUMENTS 4,263,027 A * 4/1981 Varnas .................... B01D 45/16 55/440
2010/0275561 A1* 11/2010 Lundquist ................. B04C 3/06 524/570
2015/0135661 A1* 5/2015 MacDonald ............ F24F 13/08 55/440
2015/0343366 A1* 12/2015 Wuebbeling ....... B01D 46/0002 55/346
2016/0045923 A1* 2/2016 Correia .................. B01D 45/16 55/392

FOREIGN PATENT DOCUMENTS

KR 20220073433 A * 6/2022 ............. F02M 35/06
RU 221295 U1 * 10/2023 ............. F02M 35/06

* cited by examiner

*Primary Examiner* — Minh Chau T Pham
(74) *Attorney, Agent, or Firm* — Lawrence G. Fridman, ESQ; FEIGIN & FRIDMAN, LLC

(57) ABSTRACT

A system for cleaning air flowing into an engine provided with a plurality of sub-blocks. A plurality of air separators arranged in the plurality of sub-blocks, wherein each sub-block includes air separators having a predetermined optimal air flow velocity. At least one rotary louver/shatter is associated with at least one sub-block. A controller is provided to control transitioning of at least one rotary louver/shatter based on a sensed air flow velocity into the engine or on a velocity of the vehicle.

17 Claims, 7 Drawing Sheets

SYSTEM AND METHOD OF CLEANING AIR ENTERING AN ENGINE OF A VEHICLE

CROSS-REFERENCE TO RELATED APPLICATION

The present application claims priority of U.S. Provisional Patent Application No. 63/576,266 filed Jan. 30, 2023, and U.S. Provisional Patent Application No. 63/576,961 filed Mar. 20, 2023, both of which are hereby incorporated by reference in their entirety.

FIELD OF THE INVENTION

The invention relates to devices for cleaning air entering engines, and more specifically to devices for cleaning gas turbine engines of land vehicles which operate in dusty air conditions and engines of vessels operated in sea conditions which engines are flooded with air.

BACKGROUND OF THE INVENTION

Gas turbine vehicles consume large amounts of air, in addition to diesel. Dust and particles in the air cause abrasive wear of the flow path of such gas turbine engines. With such abrasive wear, the performance of the flow paths, and consequently of the engines, is reduced to an unacceptable level, at which point a scheduled refurbishment is necessary. In a similar manner, flow paths of engines of sea vessels, which are flooded with air during their operation, are damaged by exposure to salt particles in the air flowing through the engines.

One known method of cleaning dust and debris from the air involves use of inertial air-cleaning devices, such as cyclone or ballistic separators which are usually cylindrical. However, the effectiveness of such inertial air cleaning devices depends on the air velocity flowing through them. For each type of device, there is an optimal air flow velocity at which the efficiency of the device is maximal. Any deviation from the optimal air flow velocity leads to a decrease in the efficiency of the device. Typically, a multi-sectional block of parallel-operating devices are installed on the vehicle, often occupying the entire available area of the vehicle air inlet port orifice. The exact arrangement of the devices may depend on the air flow velocity expected when the engine operates at maximal power. However, even when the air-cleaning cylindrical devices are arranged in close proximity to each other, only approximately 75% of the orifice of the air inlet of the engine is used.

In practice, each vehicle has a spectrum of vehicle speeds, where each speed corresponds to a certain engine power: for example, these may include engine idling (i.e., no speed of the vehicle), as well as low, medium, or full speed of the vehicle. However, because of this spectrum, the maximal engine power is typically used less than 10% of the service life of the engine. Thus, during most of its operation time, the engine has air flowing through the air-cleaning devices at a velocity that is different from the optimal one. As a result, the quality of air cleaning is well below the maximal potential air cleaning. This inevitably leads to a decrease in the overall service life of the engine.

There is thus a need in the art for a system and a method for cleaning air flowing through engines, such that, in the entire vehicle speed spectrum and/or at any engine power of the vehicle, air flow velocity will be optimal, or close to optimal. Thus, the cleaning of the air entering the engine will be equally effective and at a maximal level for the entire engine power spectrum, which will significantly increase the overall service life of the engine.

SUMMARY OF THE INVENTION

The invention relates to devices for cleaning air entering engines, and more specifically to devices for cleaning gas turbine engines of land vehicles which operate in dusty air conditions and engines of vessels operated in sea conditions which engines are flooded with air. For the sake of simplicity, the following description relates to land vehicles; however, the disclosure is equally applicable, methodologically and constructively, to engines of sea vessels.

According to an aspect of the present invention, an engine includes a multi-section block of air-cleaning devices, which occupies the entire flow area of an air inlet port orifice into an engine, and the throughput of which corresponds to the air flow velocity at full engine power. According to the present invention, a partial air cleaning method includes passing air entering the engine for cleaning only through a subset of the sections in the multi-section block, which, in terms of their throughput, correspond to the air consumption of the engine at the power mode specifically installed on the vehicle at a given time. Additionally, at each power mode of the engine, the optimal air flow velocity through each section of air-cleaning devices is ensured. Thus, in all modes of engine power and at all speeds of the vehicle, maximal air cleaning quality is ensured.

According to another aspect of the present invention, in order to implement the method of air cleaning using parts of the multi-section block of air-cleaning devices, the entire multi-section block is structurally divided into sub-blocks, each of which includes devices designed to optimally clean air at a specific air-flow rate, which corresponds to a specific engine power mode. To do this, each sub-block is associated with an autonomous louvers/shatters apparatus, which controls the ability of air to flow into the sub-block synchronously with changes to the engine power.

According to another aspect of the present invention, there is provided an air-cleaning device including a ballistic-type separator, made as a plurality of vertical slots. The inlet of each of the slots is configured in the form of a linear confusor. The walls of each of the slots are profiled along a curvilinear cylinder of variable radius of curvature. A U-shaped vertical collection chamber is installed in the crevice of each slot. Such slotted sections fit tightly to each other and provide almost 100% utilization of the flow area of air inlet port orifice. In some embodiments, the walls of the confusor are profiled along a cylindrical Bernoulli Lemniscate. This assists in reducing hydraulic losses in the linear confusor by creating a laminar air flow without boundary-layer separation.

According to another aspect of the present invention, tubular elements are installed behind the input edges of each pair of adjacent separator slots. The tubular elements are adapted for pumping hot substances therethrough, such as hot engine oil or hot air. For example, hot engine oil may be used to combine the functions of air separation and oil cooling. As another example, hot engine oil or hot air may be used to combine the functions of air separation and anti-icing heating of inlet devices in winter.

According to the method of the invention, the air at any power mode is not cleaned simultaneously in the entire block of air separator sections, but only cleaned in that part of the block which (in terms of its performance) is substantially equal to the air consumption by the engine at the currently set power mode. This means that the air is simultaneously passed through only a part of the air separator sections and, at the same time, wherein the optimum air flow rate is always provided, i.e., provided the maximum cleaning at all power modes of the engine.

The system of the invention is based on separation of a block of air separation sections into sub-blocks in the amount equal to the number of fractional powers at a given range of engine power modes, so that each sub-block contains the number of air separation sections having the total capacity to be equal to the engine air consumption in a particular mode, for example: idling, power of small, medium, full speed of the vehicle.

Each sub-block is activated by rotary shutters synchronized with/by the engine controls. As an example, the provided drawings illustrate the common inertial sections of the cyclonic type having a cylindrical shape. The system of the invention comprises slotted ballistic air cleaner/separators having multiple other advantages.

According to one preferred embodiment of the invention a system for cleaning air flowing into an engine air inlet of an engine of a vehicle is provided having a plurality of sub-blocks. A plurality of air separators is arranged in the plurality of sub-blocks, with each sub-block including air separators having a predetermined optimal air flow velocity. At least one rotary louver/shutters functionally associated with at least one sub-block. The rotary louver/shatter has a closed mode in which the rotary louver/shatter blocks flow of air into the air separators in the at least one sub-block, and an open mode in which air flows into the air separators in the at least one sub-block. A controller, adapted to control transitioning of at least one rotary louver/shatter between the closed mode and the open mode is provided.

In another preferred embodiment for each predetermined velocity of a plurality of predetermined velocities of the vehicle the plurality of sub-blocks includes at least one sub-block having air separators whose optimal air flow velocity corresponds to that predetermined velocity. The controller is adapted, when the vehicle is at that predetermined velocity, to ensure that the rotary louver/shatter of the corresponding at least sub-block is in the open mode.

In a further preferred embodiment the plurality of separators comprises cylindrical cyclone separators, wherein the sub-blocks comprise horizontal rows of separators, and wherein the rotary louvers/shatters comprise horizontal rotary louvers/shatters.

In a still another preferred embodiment each of the plurality of ballistic separators comprises a vertical slot having an inlet configured as a linear confusor and having walls in the form of a curvilinear cylinder of variable radius of curvature. Each vertical slot includes, at a center thereof, a U-shaped vertical dust-collection chamber, the dust-collection chamber having a smaller depth at a high portion thereof and a greater depth at a low portion thereof. U-shaped dust collection chambers of the plurality of ballistic separators engage a collection manifold connected to a gas-air ejector powered by engine exhaust gases.

In a still further preferred embodiment the system further comprises vertical tubes disposed along edges of each pair of adjacent linear confusors, the vertical tubes adapted for flow of hot substances therethrough and facilitating cooling of the hot substances and anti-icing functionalities. Each rotary louver/shatter has a rotary hinge including a circular axis installed within a hinge sleeve in an elliptical horizontal hole, the elliptical horizontal hole having a first dimension substantially equal to a diameter of the circular axis, and a second, opposing dimension greater than the diameter of the circular axis, such that a gap is formed in the sleeve, and when a torque producing force is applied to the rotary louver/shatter, the circular axis and the associated louver/shatter are displaced within the gap before pivoting.

One of the preferred embodiments of the invention relates to a two-stage air inlet system which is typical for ships having substantial resource of engine operation.

BRIEF DESCRIPTION OF THE DRAWINGS

The subject matter regarded as the invention is particularly pointed out and distinctly claimed in the concluding portion of the specification. The invention, however, both as to the system and method of operation, together with objects, features, and advantages thereof, may best be understood by reference to the following detailed description when read with the accompanying drawings in which:

Figure 1:
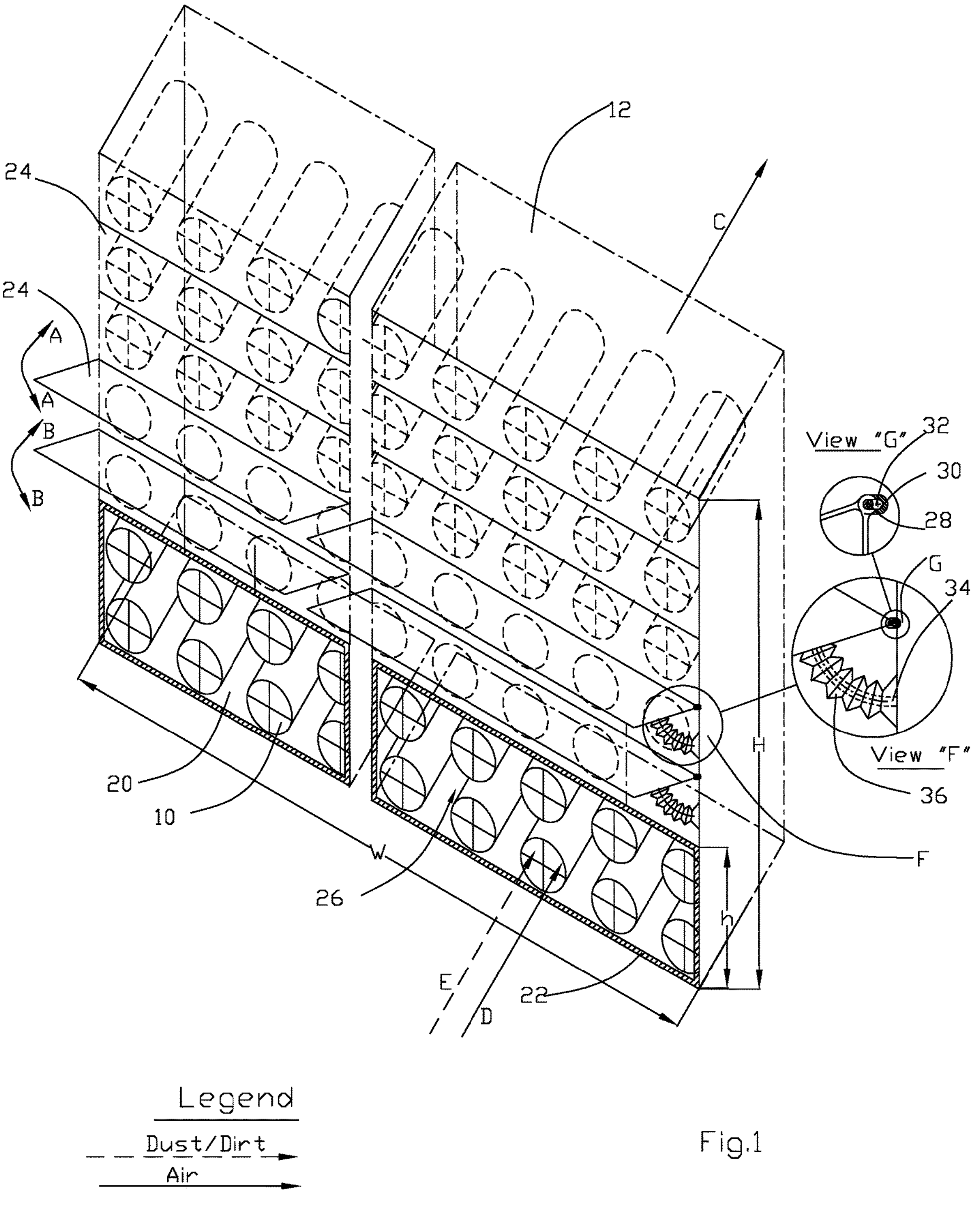
FIG. 1 is a perspective view illustration of a multi-section air-cleaning device using a cylindrical configuration according to an embodiment of the disclosed technology.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DISCLOSED TECHNOLOGY

Figure 2A:
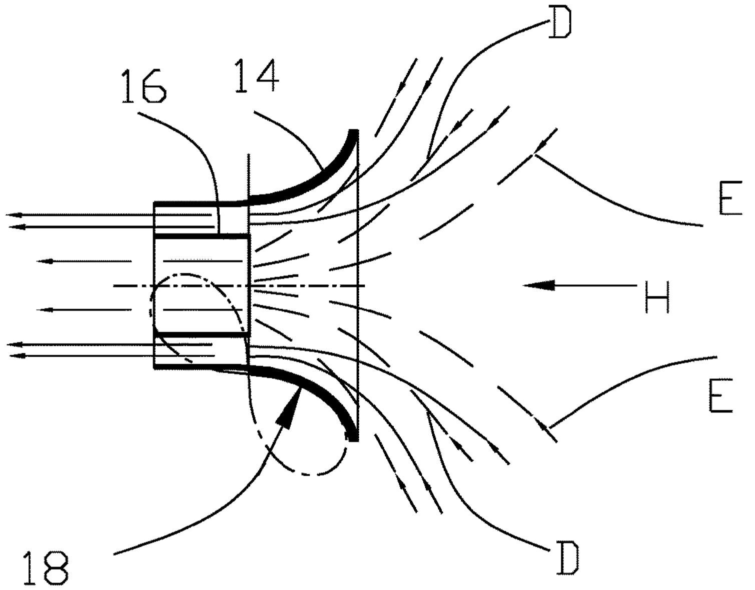
FIGS. 2A and 2B are, respectively, a cross sectional illustration and a top view illustration of an annular ballistic-type air separator, usable in the device of FIG. 1, according to an embodiment of the disclosed technology.
Figure 2B:
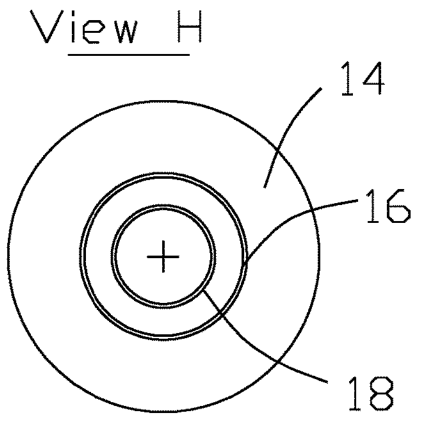
Figure 2C:
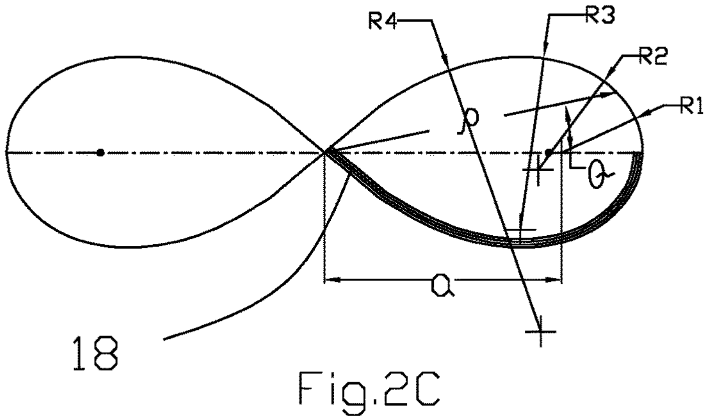
FIG. 2C is a geometric interpretation of Bernoulli's Lemniscate useful in the device of FIG. 1 according to embodiments of the disclosed technology.

Reference is now made to FIG. 1, which is a perspective view illustration of a multi-section air-cleaning device using a cylindrical configuration according to an embodiment of the disclosed technology, to FIGS. 2A and 2B, which are, respectively, a cross sectional illustration and a top view illustration and of an annular ballistic-type air separator, usable in the device of FIG. 1, according to an embodiment of the disclosed technology, and to FIG. 2C, which is a geometric interpretation of Bernoulli's Lemniscate useful in the device of FIG. 1 according to embodiments of the disclosed technology.

As seen in FIG. 1, a multi-sectional air-cleaning device 12, shown as including inertial type separators, is formed using widely used cylindrical cyclone separators 10. The separators are arranged in multiple rows and columns and occupy the air-inlet area into device 12, which forms a section having a width "W" and a height "H". The number of separators 10 in a multi-section block of separators is determined based on the correspondence between the total capacity g ($m^3$/c) of the separators to the air consumption of the engine G ($m^3$/c) when the engine is working at its maximal power. Air flow "D" is sucked in by the engine together with dust "E", and passes through the separators 10, such that clean flow "C" exits the separators 10 and enters the engine.

Each separator may be based on cylindrical ballistic air separators, an example of which is shown in FIGS. 2A and 2B. As seen, a flow portion of the separator has curvilinear confusor 14 defining an annular inlet. During operation of the separator, air flow "D" passing through confusor 14 is bent, and dust particles "E", do not contact the confusor wall and are in free ballistic motion, i.e., without the impact of contact friction forces on the walls of the separator. When centrifugal forces are applied to the separator, the dust particles are thrown to the center of the confusor 14 and fall into a collection chamber 16 installed within the confusor. Absence of frictional forces caused by contact of the dust with the sides of the confusor, as well as the swirl of the air flow through the confusor, significantly reduce the hydraulic resistance of the separator. In order to reduce hydraulic losses (which are typically present in a linear confusor) a laminar air flow without boundary-layer separation is created, by constructing the curvilinear confusor 14 to have a profile according to the Lemniscate, the geometric interpretation of which is shown in FIG. 2C.

The Bernoulli Lemniscate shown in FIG. 2C is a plane curve, which, in polar coordinates, is described by the equation:

$$\rho^2=2a^2\cos 2\theta.$$

As seen, the curve is shaped like the number "8", where the radius of curvature smoothly changes from the initial value "R1", the position of which is determined by the value "a", which determines the overall size of the Lemniscate, and up to the value "R5", which is a straight line, i.e., having an infinite (cc) radius of curvature, so that:

$$R1<R2< \ldots <R5(\infty).$$

This characteristic of the Lemniscate is used to form the annular inlet sections of the curvilinear confusor 14 of the separator, shown in FIG. 2A as section 18 indicated by a bold line. A continuous change in the direction of the air flow from the initial curvilinear to straight-line ensures the minimum amount of hydraulic losses by the separator leading into the engine inlet, thereby creating a laminar flow without boundary-layer separation.

Regardless of the hydrodynamic characteristics, in engines with high air consumption, it is necessary to install several groups of separators 10 arranged in blocks. Even with dense stacking of the cylindrical separators, non-working "dead zones" 20 are formed between the separators. As a result, only 75% of the orifice of the air-cleaning device 12 is actually used.

For each inertial separator, there is an optimal air flow velocity v (m/s), at which an efficiency k % is maximal; deviation from the optimal air flow velocity in any direction leads to a decrease in the efficiency of the separator. Specifically, a decrease in air velocity results in the centrifugal forces that throw dust particles to the periphery of the flow being insufficient. Conversely, an increase in air velocity causes secondary particle capture to occur, such that dust particles that have already come into contact with the surface of the curvilinear elements of the separator are again carried away by the air flow to the "clean" zone. Thus, for ideal operation of air-cleaning device 12, the optimal air-flow velocity for each separator 10 should be maintained.

The multi-section block of separators 10 is divided into sub-blocks by frame elements 22. Each sub-block has a height "h" and includes separators 10 designed to clean in-flowing air having an air flow velocity corresponding to one specific engine power mode. Stated differently, each sub-block is designed to clean a portion of air from the total amount of air consumed by the engine at maximum power, which portion of air corresponds to operation of the engine at a different power mode. For this purpose, each sub-block of sections is equipped with autonomous rotary louvers/shatters 24 (see "A"-"A" and "B"-"B"), which enable or disable air flow into the specific sub-block of sections synchronously with switches to the engine power. The number of separators 10 in each sub-block, which depends on the volume of the air portion to be cleaned by that sub-block, is selected to ensure the optimal air flow rate and maximum efficiency k % of the separator. Some sub-block sections, are designed for engine idling, are devoid of louvers/shatters 24, and are form an opening 26 for in-flow of air. This ensures that the engine is always ready to start.

With prolonged inactivity following operation in wet dust and dirt, some or all sections of louvers/shatters 24 may stick to walls of the corresponding frame 22. The same is true when operating in winter conditions, in which icing can, or does, occur. As shown in the enlarged views "F" and "G" of FIG. 1, each of louvers/shatters 24 is mounted on a rotary hinge having a circular axis 28. The circular axis 28 which is installed in a hinge sleeve disposed in an elliptical horizontal hole 30, having a vertical dimension equal to the diameter of the circular axis 28, and a horizontal dimension greater than the diameter of the circular axis 28. This arrangement creates a gap 32 in the sleeve, so that when a torque-producing force is applied to louvers/shatters 24, the circular axis 28 of the hinge, together with the louvers/shatters, performs a small horizontal movement within the gap 32 before turning, thereby overcoming sticking forces and breaking dried dirt, dust, ice, and the like. The force effect on louvers/shatters 24 is actuated, or assisted, by a linear activator 34, including an elastic length-changing element, for example in the form of a bellow 36. The bellow 36 may be activated by air pressure supplied to it, for example taken from a compressor of the engine. When the air pressure is released, the return of louvers/shatters 24 to their closed position is assisted by the suction effect of the engine.

Figure 4:
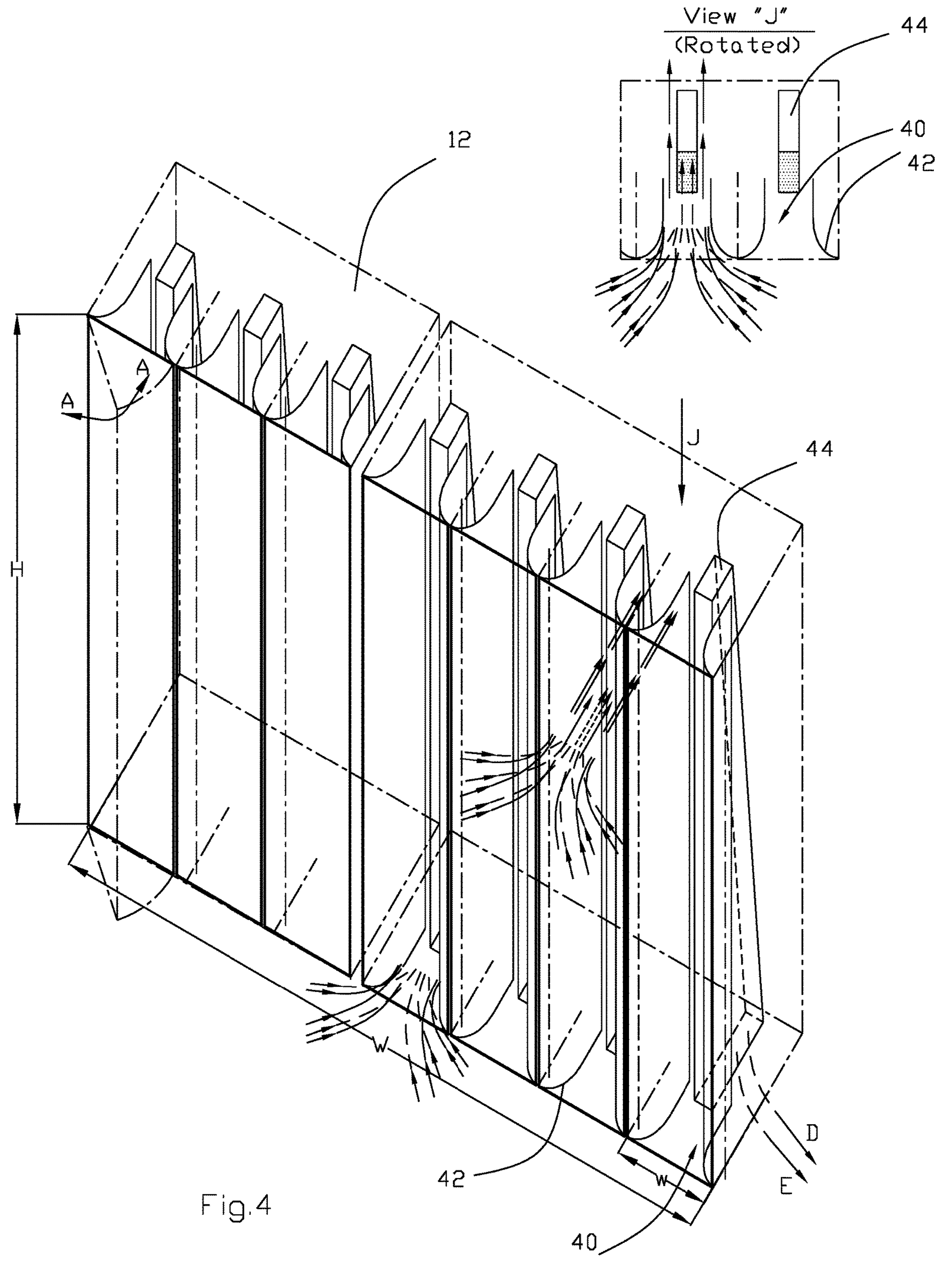
FIG. 4 is a perspective view of a multi-section air-cleaning device using a slotted configuration according to another embodiment of the disclosed technology.
Figure 5:
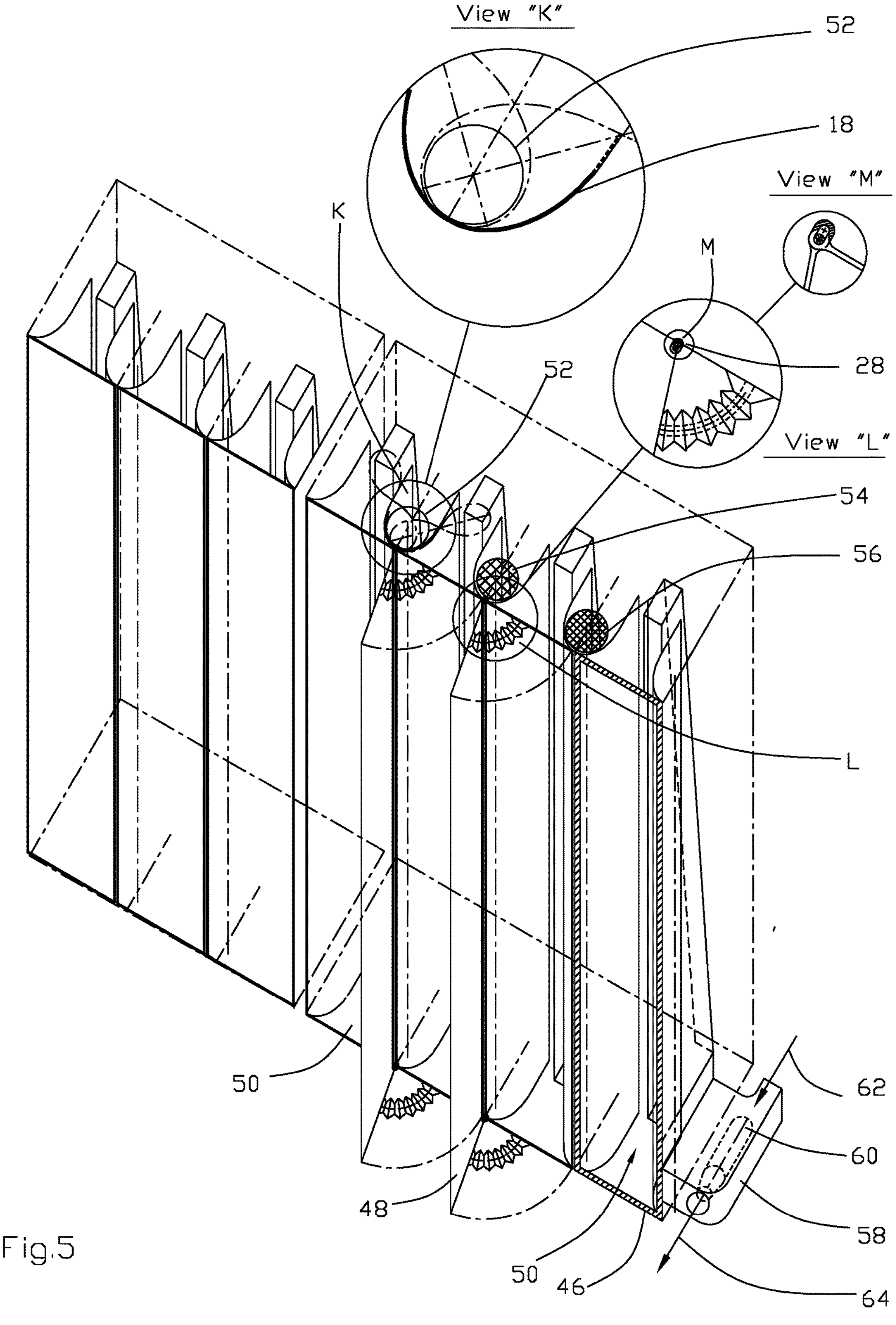
FIG. 5 is a perspective view of the multi-section air-cleaning device of FIG. 4, having multiple activated sub-blocks.

Reference is now made to FIG. 4, which is a perspective view of a multi-section air-cleaning device 12 using a slotted configuration according to another embodiment of the disclosed technology, and to FIG. 5, which is a perspective view of the multi-section air-cleaning device 12, having multiple activated sub-blocks.

Figure 3:
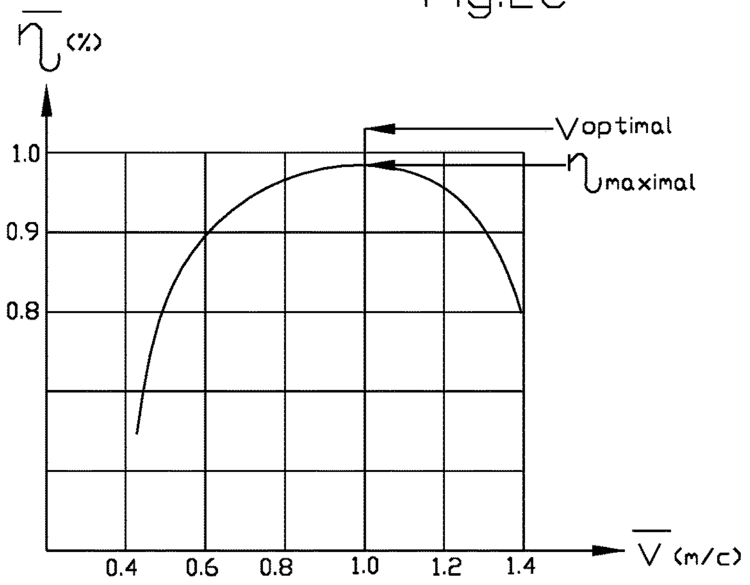
FIG. 3 illustrates physics of the separation process.

In air-cleaning device 12 shown in FIGS. 4 and 5, the cylindrical separators (item 10, FIGS. 1-3) are replaced by separators 40 formed as a series of vertical slots. An inlet section of each vertical slot is configured as a linear confusor 42, having walls profiled along a curved cylinder having variable radius of curvature. The curvature of the walls of separator 40 is in accordance with the Bernoulli Lemniscate 18 and are analogous to that shown in FIGS. 2A and 2B. A vertical dust collection chamber 44 is installed at a distal end of slot of separator 40, or at the deepest part thereof. The depth of dust collection chamber 44 increases longitudinally down the length of the slot of separator 40 to collect accumulated dust. Stated differently, dust collection chamber 44 is narrower at the upper portion thereof, and deeper at the lower portion thereof, as shown in FIG. 4.

The aerodynamic operation of separation in the in-line separators 40 employing linear confusor 42 is similar to the operation of the annular separators 10 shown in FIGS. 2A and 2B. Specifically, dust is trapped in chamber 44 by gravitational forces, which are further stimulated by high-speed air flow through separators 40. The slotted sections fit tightly to each other and provide almost 100% utilization of the flow area of the air inlet of air-cleaning device 12.

In a similar manner to that shown in FIG. 1, groups of slot-based separators 40 and confusors 42 are separated from each other by frame elements 46 into sub-blocks. For example, in the illustrated embodiment, the right-most confusor and slot form a single sub-block having a width "w". The separators 40 of each sub-block are designed to clean the air at one specific engine power mode, in a similar manner to that described hereinabove. Each sub-block of separators 40 is equipped with autonomous vertical rotary louvers/shatters 48, which control the air flow into the slots synchronously with switching of the engine power. The number of slots 40 in each sub-block is selected in a similar manner to that described hereinabove for separators 10. The specific sub-block designed for engine idling, here shown as including the right-most separator 40, is free from louvers/shatters 48 and has a permanent opening 50 that ensures that the engine is always ready to start.

In some embodiments, and as illustrated in FIG. 5, behind the inlet confusors 42 of one or more pairs of adjacent separators 40, there are provided tubular elements 52. Tubular elements 52 are designed and configured for pumping hot substances therethrough. For example, tubular elements 52 may be designed for passage of hot engine oil 54 therethrough, so as to combine the functions of air separation and oil cooling. As another example, tubular elements 52 may be designed for passage of hot oil or hot air 56 therethrough, so as to combine the functions of air separation and anti-icing heating of inlet devices in winter.

The actuator of rotary louvers/shatters 48, shown in the enlarged views "L" and "M" in FIG. 5, is substantially similar to that described hereinabove with respect to FIG. 1, and shown in enlarged views "G" and "F" therein.

A lower portion of some, or all, of dust collection chambers 44 are connected to each other via a manifold 58 having a built-in gas ejector 60. Using exhaust gases 62, gas ejector 60, dust 64 is sucked from collection chambers 44 and removed from the system.

FIGS. 1 and 5 show a sub-set of sub-blocks for which the louvers/shatters 48 are open. These sub-blocks include the sub-blocks which operate optimally when the engine is idle, as well as two adjacent blocks. The arrangement shown in FIGS. 1 and 5 corresponds to operation of the separators at the optimum air flow velocity when the vehicle is driving at low vehicle speed.

Figure 6:
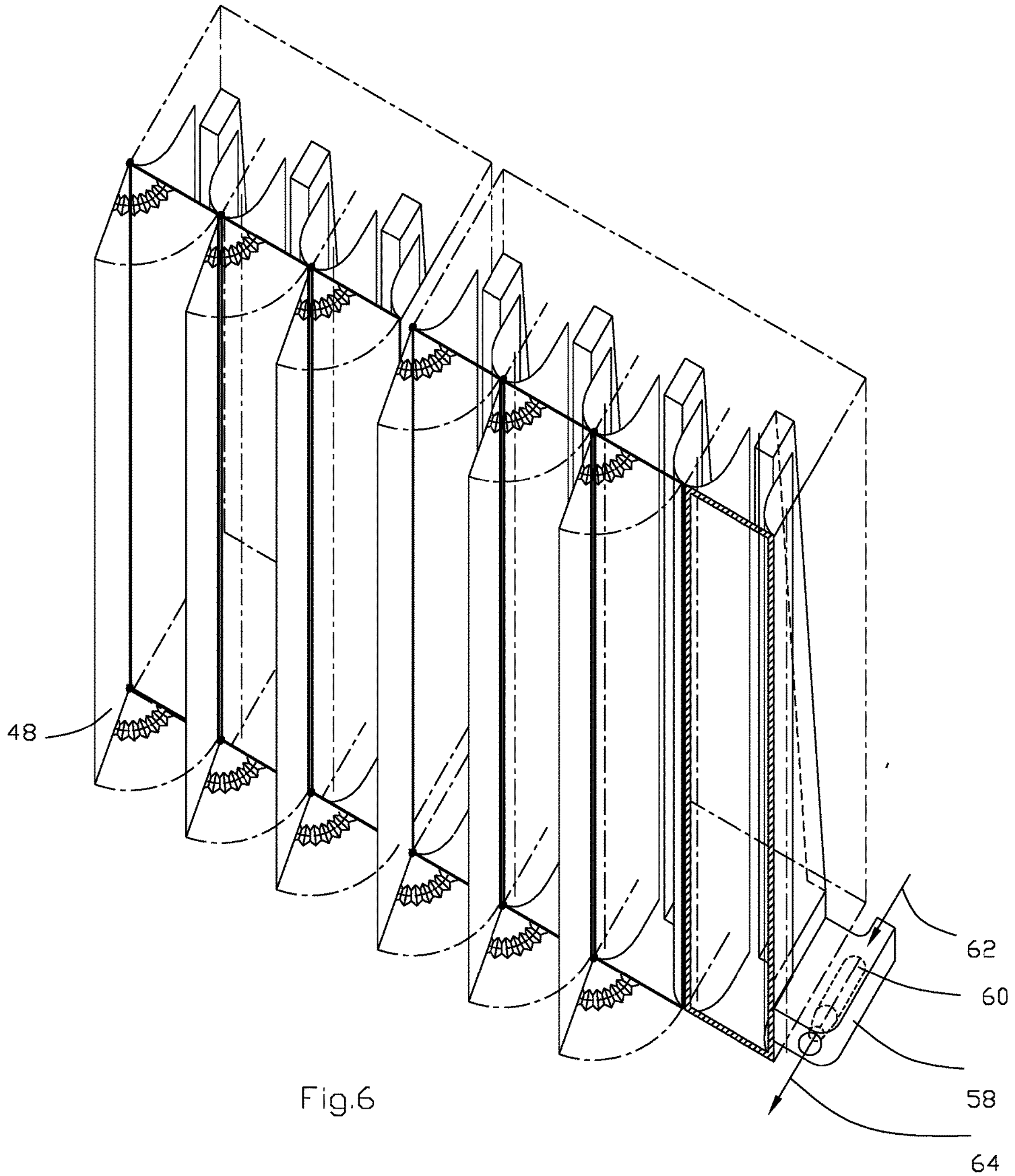
FIG. 6 is a perspective view of the multi-section air-cleaning device of FIG. 4 wherein all the sub-blocks are activated.

FIG. 6 shows the air-cleaning device 12 with all the rotary louvers/shatters 48 of all sub-blocks of separators 40 being open. This arrangement corresponds to optimal air flow velocity when the vehicle is driving at full speed.

In accordance with the present invention, the opening of the rotary louvers/shatters in each of the air-cleaning devices is selected to correspond to the needs of the engine in each power mode. Thus, the air flow velocity at all separator sections will be constant and will correspond to the optimal for that section, providing maximum and equally effective air cleaning in all modes.

In FIGS. 1 to 6, the method and device disclosed herein can be implemented not only for gas turbine motors of land vehicles, but also on gas turbine motors of water vessels. Generally, gas turbine motors of water vessels include multi-section polypropylene filters—known as "Knitted Mesh" coagulators—are used to clean air from splashes and aerosols of salty sea water. Similarly, to the optimal flow rate described above for inertial separators, there is also an optimal flow rate of watered air for such coagulators, deviation from which leads to a decrease in efficiency.

Figure 7:
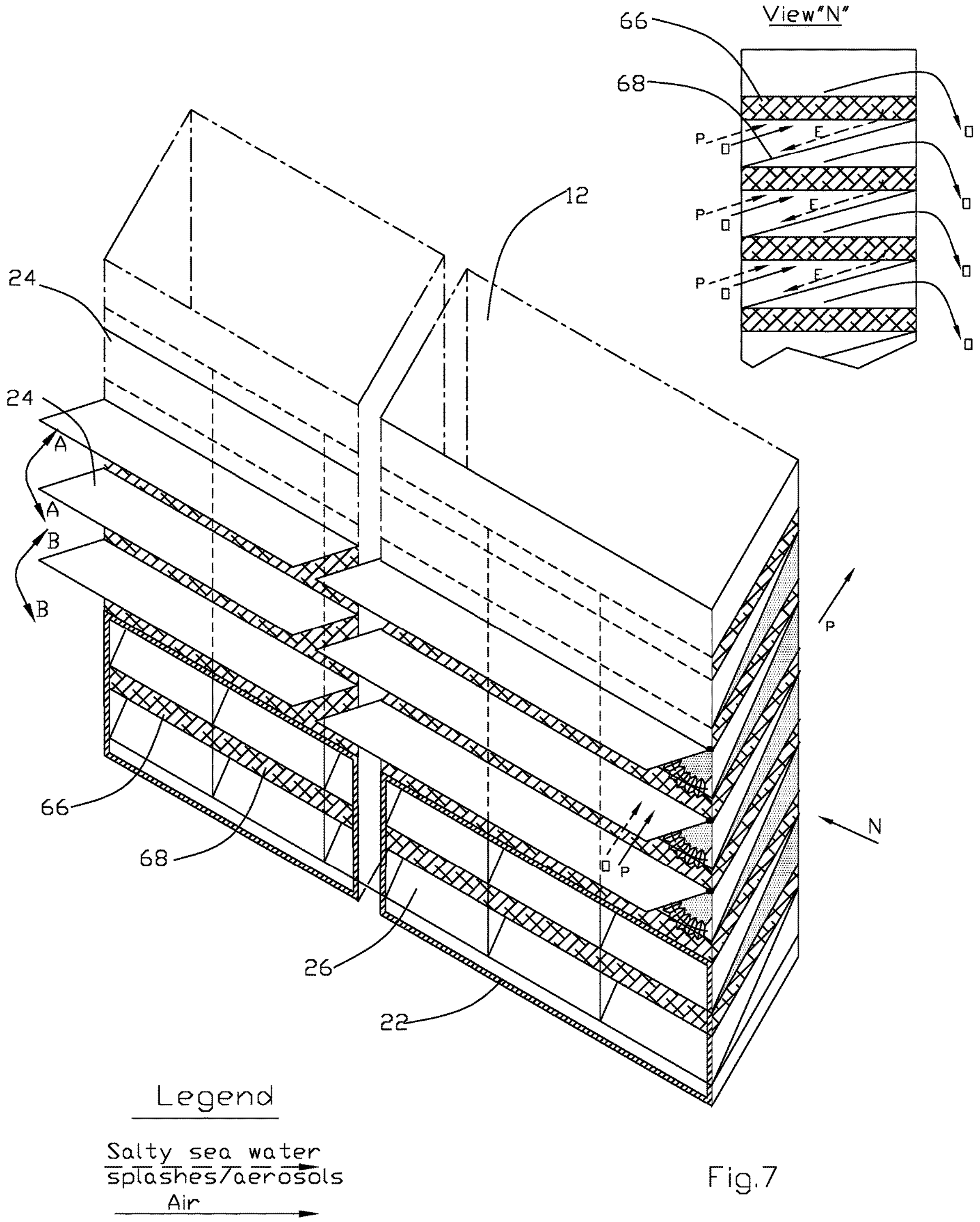
FIG. 7 is a perspective view of a multi-section mesh-type air-cleaning device according to an embodiment of the disclosed technology.

FIG. 7 shows a multi-section air cleaning device 12 having a "Knitted Mesh" type filter, which is arranged in a saw-tooth stacked layout as is common in the field of shipbuilding. In a similar manner to that described hereinabove, the air cleaning device is divided into multiple sections of filters 66, each of which is installed horizontally and is provided with an inclined drainage plate 68. Air flow, indicated by arrow "0", which includes splashes and aerosols of salty sea water indicated by arrow "P" passes through the filters 66 from bottom to top, as shown in enlarged view N. The optimal air flow rate through the filters 66 is about 4-5 m/s. At this flow rate, water particles are deposited on the filter threads and are carried by the air flow along the threads until they touch the knots of the weave of the threads. The knots of the weave cause the water droplets to merge (coalesce) into larger droplets, which, under the influence of gravitational forces, fall through the thickness of the filter (4.0"/$100_{MM}$) onto the inclined panel 68. The droplets then roll down panel 68 and out of the cleaning device. The filters 66 are divided into sub-blocks having rotational louvers/shatters, as described hereinabove, mutatis mutandis.

On vessels where the water has a high air content, such as high speed craft, hovercraft and the like, a two-stage cleaning system can be installed, where a first stage (coarse air cleaning) is in the form of inertial separator as described hereinabove with respect to FIGS. 1-6, and a second stage (fine air cleaning) is in the form of "Knitted Mesh" type filters described herein and shown in FIG. 7.

Figure 8:
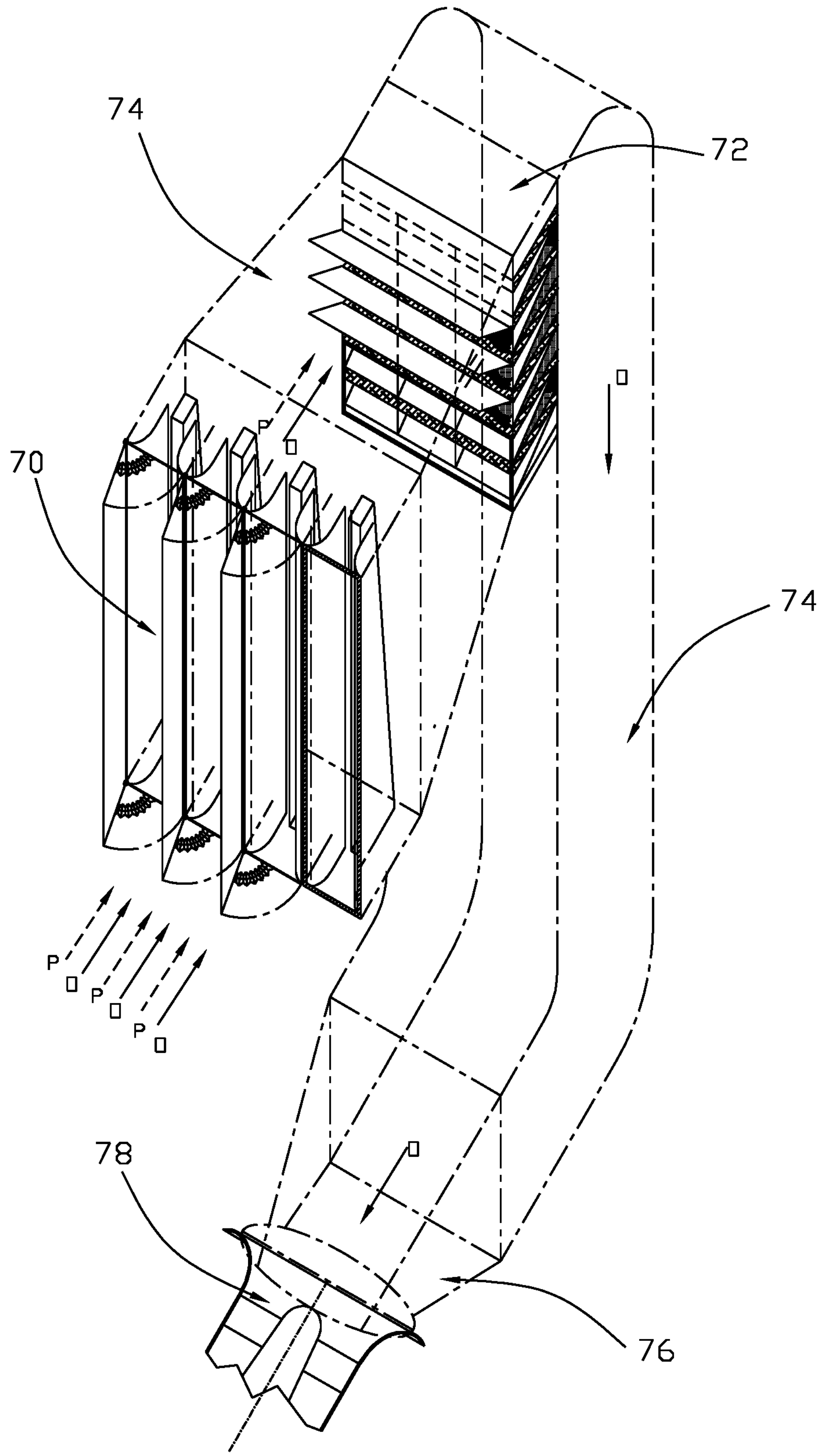
FIG. 8 is a perspective view of a two-stage air-cleaning device according to an embodiment of the disclosed technology.

FIG. 8 shows an exemplary two-stage air cleaning system of a vessel, in accordance with embodiments described herein. The air cleaning system includes a multi-section slotted ballistic separator (or other spray eliminator) 70, substantially as described hereinabove with respect to FIG. 4-6. First separator 70 carries out the first cleaning step, as described above. Output of first separator 70 flows into a second, multi-section Knitted Mesh type separator 72, substantially as described herein above with respect to FIG. 7. Second separator 72 carries out the second cleaning step, as described hereinabove. Both first separator 70 and second separator 72 are disposed in an air inlet duct 74, which provides air supply to a gas turbine engine 78 via an inlet plenum 76. The control of partial air flows in separators 70 and 72 is carried out autonomously, but synchronously with a change in the power mode of the engine 78, for example by a controller element (not explicitly shown).

As discussed above and illustrated in FIG. 3, a decrease in the work efficiency when the air flow rate deviates from the optimal value is inherent not only in inertial separators, but also in "Knitted Mesh" filters—coagulators. This is in contrast to the barrier dust filters, the effectiveness of which is determined only by the ratio of cell sizes and dust particles. The latter is explained by the fact that the operation of the coagulators significantly depends on the forces of inertia of the moist air flow, which contribute to the adhesion of water particles to the polypropylene filter threads.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system for cleaning air flowing into an engine air inlet of an engine of a vehicle, the system comprising:

a plurality of sub-blocks, each being enclosed by a frame;

a plurality of air separators arranged in the plurality of sub-blocks, wherein each sub-block includes air separators having a predetermined optimal air flow velocity;

at least one rotary louver/shatter, functionally associated with at least one frame of at least one sub-block, the rotary louver/shatter having a closed mode in which the rotary louver/shatter blocks flow of air into the air separators in the at least one sub-block, and an open mode in which air flows into the air separators in the at least one sub-block; and a controller, adapted to control transitioning of the at least one rotary louver/shatter between the closed mode and the open mode, based on a sensed air flow velocity into the engine or on a velocity of the vehicle, wherein the air separators cover a substantial area of the space of the engine air inlet.

2. The system of claim 1, wherein, for each predetermined velocity of a plurality of predetermined velocities of the vehicle, the plurality of sub-blocks includes at least one sub-block having air separators whose optimal air flow velocity corresponds to that predetermined velocity, and wherein the controller is adapted, when the vehicle is at that predetermined velocity, to ensure that the rotary louver/shatter of the corresponding at least sub-block is in the open mode.

3. The system of claim 2, wherein the plurality of predetermined velocities include engine idling, low vehicle speed, medium vehicle speed, and high vehicle speed.

4. The system of claim 1, wherein the plurality of separators comprises cylindrical cyclone separators, wherein the sub-blocks comprise horizontal rows of separators, and wherein the rotary louvers/shatters comprise horizontal rotary louvers/shatters.

5. The system of claim 1, wherein the plurality of separators comprises a plurality of vertically arranged ballistic separators, and wherein the rotary louvers/shatters comprise vertical rotary louvers/shatters.

6. The system of claim 5, wherein each of the plurality of ballistic separators comprises a vertical slot having an inlet configured as a linear confusor and having walls in the form of a curvilinear cylinder of variable radius of curvature.

7. The system of claim 6, wherein each vertical slot includes, at a center thereof, a U-shaped vertical dust-collection chamber, the dust-collection chamber having a smaller depth at a high portion thereof and a greater depth at a low portion thereof.

8. The system of claim 7, wherein U-shaped dust collection chambers of the plurality of ballistic separators engage a collection manifold connected to a gas-air ejector powered by engine exhaust gases.

9. The system of claim 6, further comprising vertical tubes disposed along edges of each pair of adjacent linear confusors, the vertical tubes adapted for flow of hot fluids therethrough and facilitating cooling of the hot fluids/substances and anti-icing functionalities.

10. The system of claim 9, wherein the hot fluid/substance comprises hot engine oil.

11. The system of claim 9, wherein the hot fluid/substance comprises hot air.

12. The system of claim 1, wherein at least one sub-block, having an optimal air flow corresponding to idling of the engine, is devoid of a rotary louver/shatter and is always in the open mode.

13. The system of claim 1, wherein each of said at least one rotary louver/shatter has a rotary hinge including a circular axis installed within a hinge sleeve in an elliptical horizontal hole, the elliptical horizontal hole having a first dimension substantially equal to a diameter of the circular axis, and a second, opposing dimension greater than the diameter of the circular axis, such that a gap is formed in the sleeve, and when a torque producing force is applied to the rotary louver/shatter, the circular axis and the associated louver/shatter are displaced within the gap before pivoting.

14. The system of claim 1, wherein in said plurality of air separators the air flow rate is substantially identical, and the air flow through the simultaneously activated sub-blocks (containing a different number of sections) is different to meet need of the engine in the power mode for which said sub-block or a group of said sub-blocks are intended.

15. The method of partial engine air purification utilizing the system of claim 1, comprising cleaning the air in a multi-section block of cleaning devices occupying the entire flow area of the air inlet, wherein the number of sections is selected based on ensuring their total performance at optimal air speed to the air consumption of the engine at maximum power.

16. The method of partial engine air purification utilizing the system of claim 1, wherein the air at each engine power mode is simultaneously passed for cleaning through a limited sub-block of sections, which in its total throughput corresponds to a portion of the air flow rate of the engine in its full power mode.

17. The method of partial engine air purification utilizing the system of claim 1, wherein a specified partial air purification step is activated and deactivated synchronously with changes in engine power modes to ensure maximum achievable air purification over the entire range of vehicle speeds.

* * * * *